US011721019B2

(12) United States Patent
Nefian et al.

(10) Patent No.: US 11,721,019 B2
(45) Date of Patent: Aug. 8, 2023

(54) ANOMALY DETECTION SYSTEM

(71) Applicant: Intelinair, Inc., Champaign, IL (US)

(72) Inventors: Ara Victor Nefian, San Francisco, CA (US); Hrant Khachatryan, Yerevan (AM); Hovnatan Karapetyan, Yerevan (AM); Naira Hovakymian, Champaign, IL (US)

(73) Assignee: Intelinair, Inc., Champaign, IL (US)

( * ) Notice: Subject to any disclaimer, the term of this patent is extended or adjusted under 35 U.S.C. 154(b) by 153 days.

(21) Appl. No.: 17/401,457

(22) Filed: Aug. 13, 2021

(65) Prior Publication Data
US 2021/0374930 A1 Dec. 2, 2021

Related U.S. Application Data

(63) Continuation of application No. 16/245,758, filed on Jan. 11, 2019, now Pat. No. 11,094,055.
(Continued)

(51) Int. Cl.
| G06T 7/11 | (2017.01) |
| G06K 9/00 | (2022.01) |
| G06T 7/73 | (2017.01) |
| G06T 7/10 | (2017.01) |
| G06K 9/62 | (2022.01) |
| G06T 5/00 | (2006.01) |
| G06T 5/20 | (2006.01) |
| G06T 5/50 | (2006.01) |
| G06T 7/00 | (2017.01) |

(Continued)

(52) U.S. Cl.
CPC ............ *G06T 7/0012* (2013.01); *G06T 5/002* (2013.01); *G06T 5/20* (2013.01); *G06T 5/50* (2013.01); *G06T 7/001* (2013.01); *G06T 7/0002* (2013.01); *G06T 7/10* (2017.01); *G06T 7/11* (2017.01); *G06T 7/136* (2017.01); *G06T 7/74* (2017.01); *G06V 20/188* (2022.01); *G06T 2207/10024* (2013.01); *G06T 2207/10032* (2013.01); *G06T 2207/20021* (2013.01); *G06T 2207/30188* (2013.01)

(58) Field of Classification Search
CPC ............. G06K 9/00657; G06K 9/2018; G06K 9/6212; G06T 2207/10032; G06T 2207/20021; G06T 2207/30188; G06T 7/11; G06T 7/136; G06T 2207/10024; G06T 2207/20056; G06T 5/002; G06T 5/20; G06T 5/50; G06T 7/0002; G06T 7/001; G06T 7/0012; G06T 7/10; G06T 7/12; G06T 7/168; G06T 7/74
See application file for complete search history.

(56) References Cited

U.S. PATENT DOCUMENTS

| 2012/0070051 A1* | 3/2012 | Vincent | A61B 8/5207 382/131 |
| 2014/0248002 A1* | 9/2014 | Thakkar | H04N 21/2665 382/305 |

(Continued)

*Primary Examiner* — Santiago Garcia
(74) *Attorney, Agent, or Firm* — KCO Legal, Inc.

(57) ABSTRACT

An image analysis system including an image gathering unit that gathers a high-altitude image having multiple channels, an image analysis unit that segments the high-altitude image into a plurality of equally size tiles and determines an index value based on at least one channel of the image where the image analysis unit identifies areas containing anomalies in each image.

20 Claims, 3 Drawing Sheets

Related U.S. Application Data

(60) Provisional application No. 62/616,159, filed on Jan. 11, 2018.

(51) Int. Cl.
*G06V 20/10* (2022.01)
*G06T 7/136* (2017.01)

(56) References Cited

U.S. PATENT DOCUMENTS

2019/0073534 A1* 3/2019 Dvir ............... H04W 4/185
2019/0104722 A1* 4/2019 Slaughter ............ G06T 7/0012
2019/0220666 A1* 7/2019 Kiepe ................ A01M 21/043

* cited by examiner

ANOMALY DETECTION SYSTEM

CROSS REFERENCE TO RELATED APPLICATIONS

This application is a continuation of U.S. patent application Ser. No. 16/245,758 filed Jan. 11, 2019, which is a non-provisional patent application that claims the benefit of and the priority from U.S. Provisional Patent Application No. 62/616,159, filed Jan. 11, 2018, titled ANOMALY DETECTION SYSTEM.

BACKGROUND OF THE INVENTION

The agriculture industry comprises a large portion of the world's economy. In addition, as the population of the world increases annually, more food must be produced by existing agricultural assets. In order to increase yields on existing plots of farm land, producers require a clear understanding of plant and soil conditions. However, as a single farm may encompass hundreds of acres, it is difficult to access the conditions of the farm land.

Currently, farmers rely on their observations of their land along with prior experience to determine the requirements to increase the yield of their farm land. These observations may include identifying locations of weeds, identifying plant illnesses and determining levels of crop damage. However, considering the large number of acres in the average farm, these observations are not a reliable method to increase yields. Therefore, a need exists for system that will allow a farmer to better understand the conditions of their farm land.

SUMMARY OF THE INVENTION

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

One embodiment of the present disclosure includes an image analysis system including an image gathering unit that gathers a high-altitude image having multiple channels, an image analysis unit that segments the high-altitude image into a plurality of equally size tiles and determines an index value based on at least one channel of the image where the image analysis unit identifies areas containing anomalies in each image.

In another embodiment, the index determined is a normal differential vegetation index for a segment of the captured image.

In another embodiment, the index determined is a soil adjusted vegetation index for a segment of the captured image.

In another embodiment, the image analysis unit masks the segment of the image using a confidence mask based on the index value.

In another embodiment, the image analysis unit normalizes the masked segment of the image.

In another embodiment, the image analysis unit calculates a mean and standard deviation of the segment of the normalized image.

In another embodiment, the image analysis unit applies a box averaging threshold to the segment of the normalized image.

In another embodiment, the image analysis unit calculates a mean for each pixel in the applied box.

In another embodiment, the image analysis unit removes pixels from the segment of the image that have a calculated mean below a predetermined threshold.

In another embodiment, the image analysis unit calculates a score for each of the remaining pixels and draws a rectangle around groups of pixels based on the scores of each pixel.

Another embodiment of the present disclosure includes, a method of analyzing an image, the method including the steps of gathering a high-altitude image having multiple channels via an image gathering unit, segmenting the high-altitude image into a plurality of equally size tiles via an image analysis unit, determining an index value based on at least one channel of the image via the image analysis unit, identifying areas containing anomalies in each image via the image analysis unit.

In another embodiment, the index determined is a normal differential vegetation index for a segment of the captured image.

In another embodiment, the index determined is a soil adjusted vegetation index for a segment of the captured image.

In another embodiment, the step of identifying anomalies includes masking the segment of the image using a confidence mask based on the index value.

In another embodiment, the step of identifying anomalies includes normalizing the masked segment of the image.

In another embodiment, the step of identifying anomalies includes calculating a mean and standard deviation of the segment of the normalized image.

In another embodiment, the step of identifying anomalies includes applying a box averaging threshold to the segment of the normalized image.

In another embodiment, the step of identifying anomalies includes calculating a mean for each pixel in the applied box.

In another embodiment, the step of identifying anomalies includes removing pixels from the segment of the image that have a calculated mean below a predetermined threshold.

In another embodiment, the step of identifying anomalies includes calculating a score for each of the remaining pixels and drawing a rectangle around groups of pixels based on the scores of each pixel.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Figure 1:
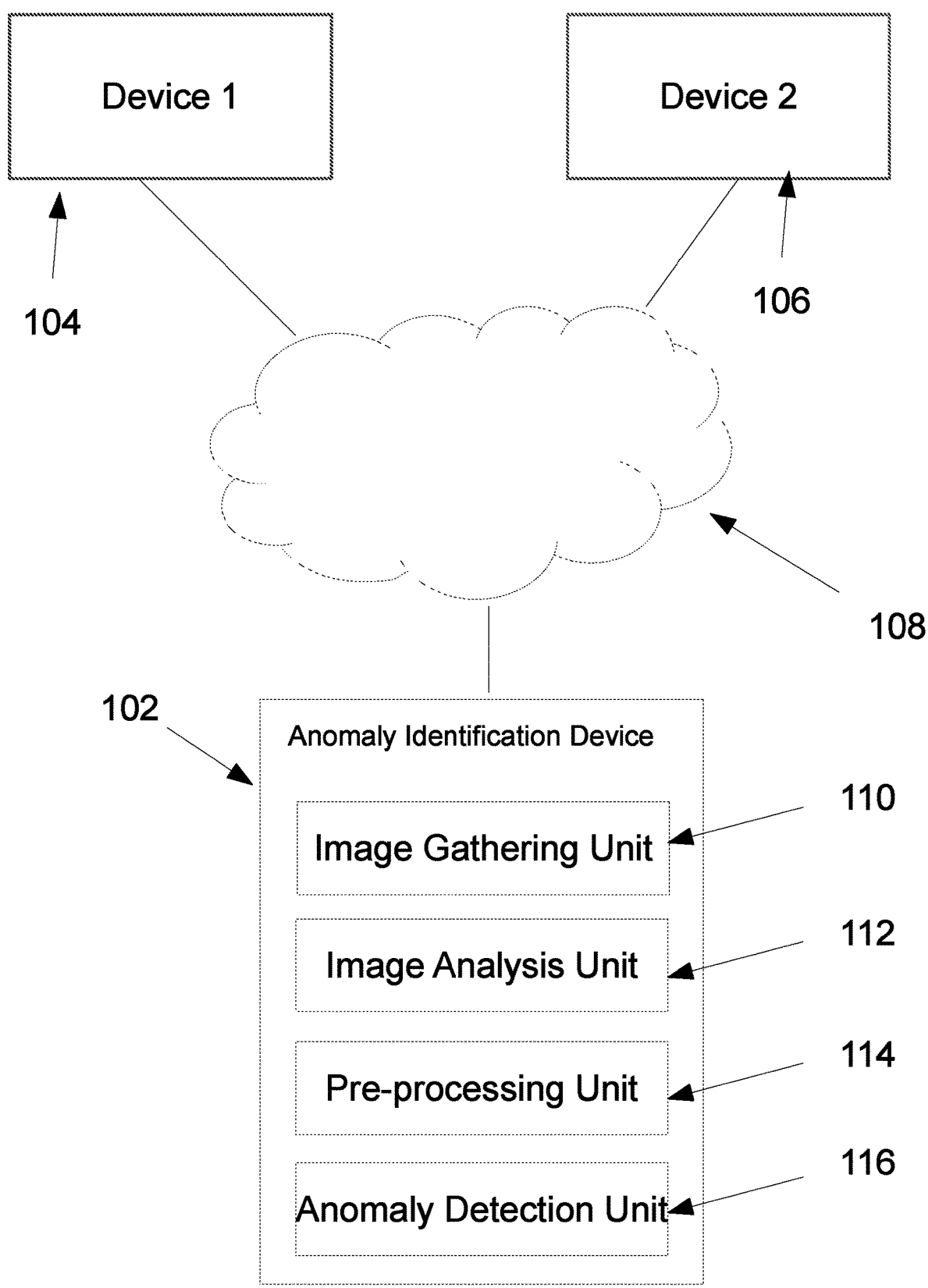
FIG. 1 depicts one embodiment of an anomaly identification system consistent with the present invention.

Referring now to the drawings which depict different embodiments consistent with the present invention, wherever possible, the same reference numbers will be used throughout the drawings and the following description to refer to the same or like parts.

The anomaly identification system 100 gathers medium to low resolution images gathered from an aircraft flying above 1,500 feet. Each image is then analyzed using NDVI and SDVI parameters and is normalized. After normalization, specific adjacent areas are analyzed to identity anomalies in each portion. After specific anomalies are identified, the system combines the various portions to generate a map of all anomalies it the image that are identified using rectangles outlining the anomaly area.

FIG. 1 depicts one embodiment of an anomaly identification system 100 consistent with the present invention. The anomaly identification system 100 includes a anomaly identification device 102, a communication device 1 104, a communication device 2 106 each communicatively connected via a network 108. The anomaly identification system 100 further includes an image gathering unit 110, an image analysis unit 112, a preprocessing unit 114 and an anomaly identification unit 116.

The image gathering unit 110 and image analysis unit 112 may be embodied by one or more servers. Alternatively, each of the preprocessing unit 114 and anomaly identification unit 116 may be implemented using any combination of hardware and software, whether as incorporated in a single device or as a functionally distributed across multiple platforms and devices.

In one embodiment, the network 108 is a cellular network, a TCP/IP network, or any other suitable network topology. In another embodiment, the anomlay identification device may be servers, workstations, network appliances or any other suitable data storage devices. In another embodiment, the communication devices 104 and 106 may be any combination of cellular phones, telephones, personal data assistants, or any other suitable communication devices. In one embodiment, the network 102 may be any private or public communication network known to one skilled in the art such as a local area network ("LAN"), wide area network ("WAN"), peer-to-peer network, cellular network or any suitable network, using standard communication protocols. The network 108 may include hardwired as well as wireless branches. The image gathering unit 112 may be a digital camera.

Figure 2:
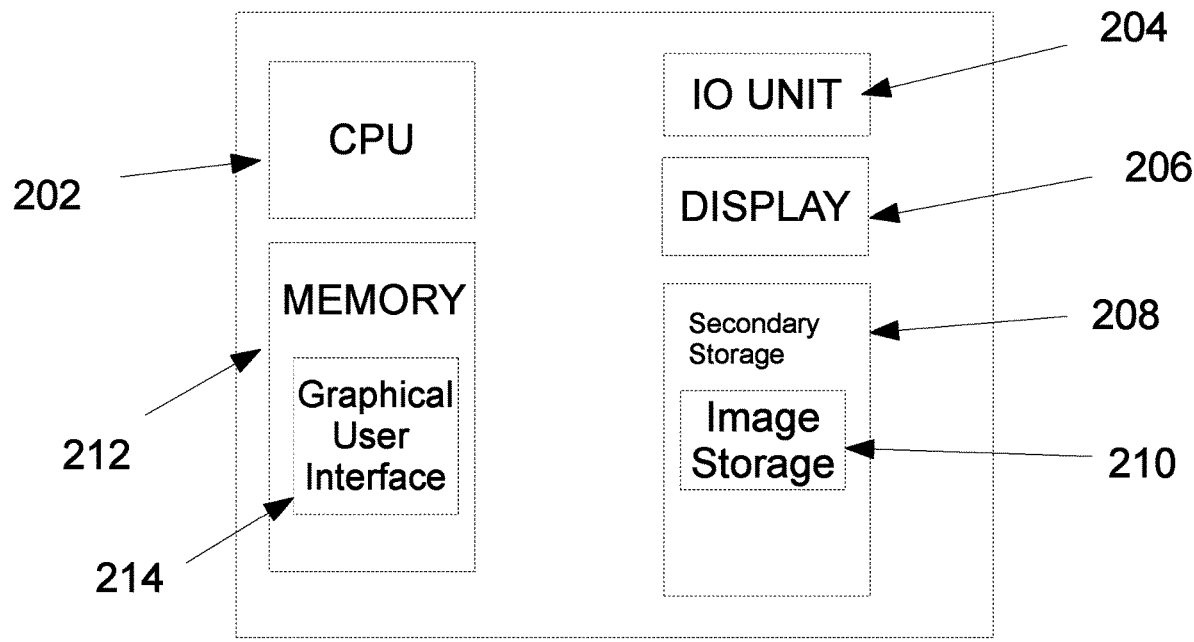
FIG. 2 depicts one embodiment of an anomaly detection unit.

FIG. 2 depicts one embodiment of an anomaly detection device 102. The anomaly detection device 102 includes a network I/O device 204, a processor 202, a display 206 and a secondary storage 208 running image storage unit 210 and a memory 212 running a graphical user interface 214. The image gathering unit 112, operating in memory 208 of the anomaly detection unit 102, is operatively configured to receive an image from the network I/O device 204. In one embodiment, the processor 202 may be a central processing unit ("CPU"), an application specific integrated circuit ("ASIC"), a microprocessor or any other suitable processing device. The memory 212 may include a hard disk, random access memory, cache, removable media drive, mass storage or configuration suitable as storage for data, instructions, and information. In one embodiment, the memory 208 and processor 202 may be integrated. The memory may use any type of volatile or non-volatile storage techniques and mediums. The network I/O line 204 device may be a network interface card, a cellular interface card, a plain old telephone service ("POTS") interface card, an ASCII interface card, or any other suitable network interface device. The anomaly detection unit 114 may be a compiled program running on a server, a process running on a microprocessor or any other suitable port control software.

Figure 3:
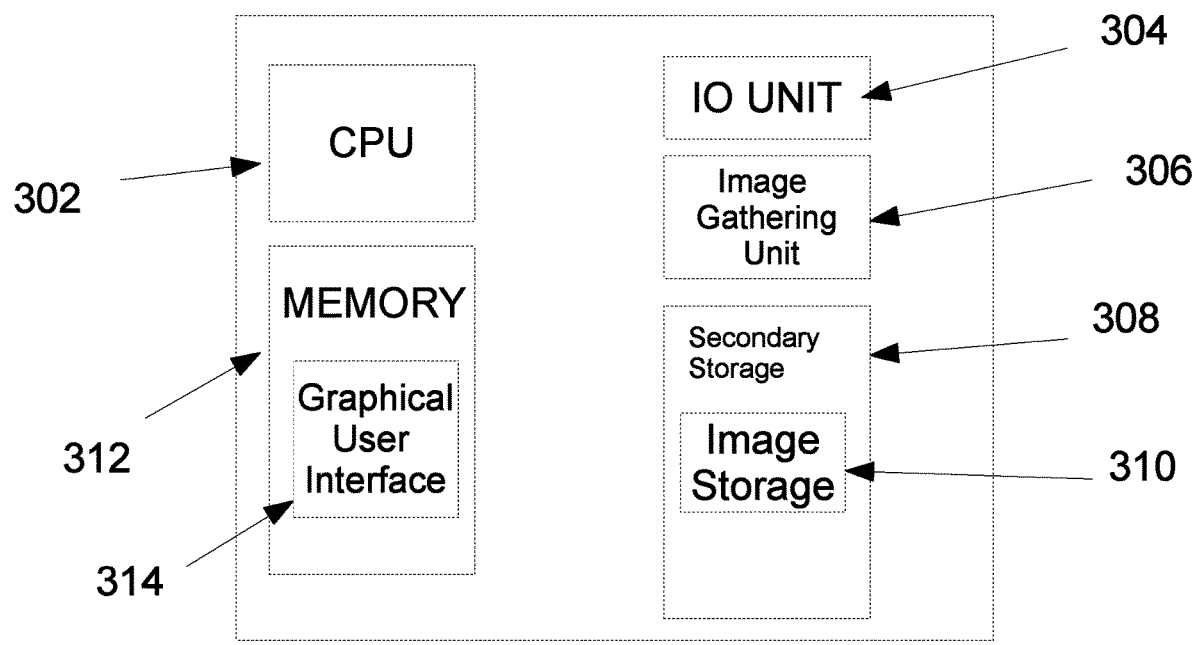
FIG. 3 depicts one embodiment of a communication device consistent with the present invention.

FIG. 3 depicts one embodiment of a communication device 104/106 consistent with the present invention. The communication device 104/1106 includes a processor 302, a network I/O Unit 304, an image capture unit 306, a secondary storage unit 308 including an image storage device 310, and memory 312 running a graphical user interface 314. In one embodiment, the processor 302 may be a central processing unit ("CPU"), a application specific integrated circuit ("ASIC"), a microprocessor or any other suitable processing device. The memory 312 may include a hard disk, random access memory, cache, removable media drive, mass storage or configuration suitable as storage for data, instructions, and information. In one embodiment, the memory 312 and processor 302 may be integrated. The memory may use any type of volatile or non-volatile storage techniques and mediums. The network I/O device 304 may be a network interface card, a plain old telephone service ("POTS") interface card, an ASCII interface card, or any other suitable network interface device.

In one embodiment, the network 108 may be any private or public communication network known to one skilled in the art such as a Local Area Network ("LAN"), Wide Area Network ("WAN"), Peer-to-Peer Network, Cellular network or any suitable network, using standard communication protocols. The network 108 may include hardwired as well as wireless branches.

Figure 4:
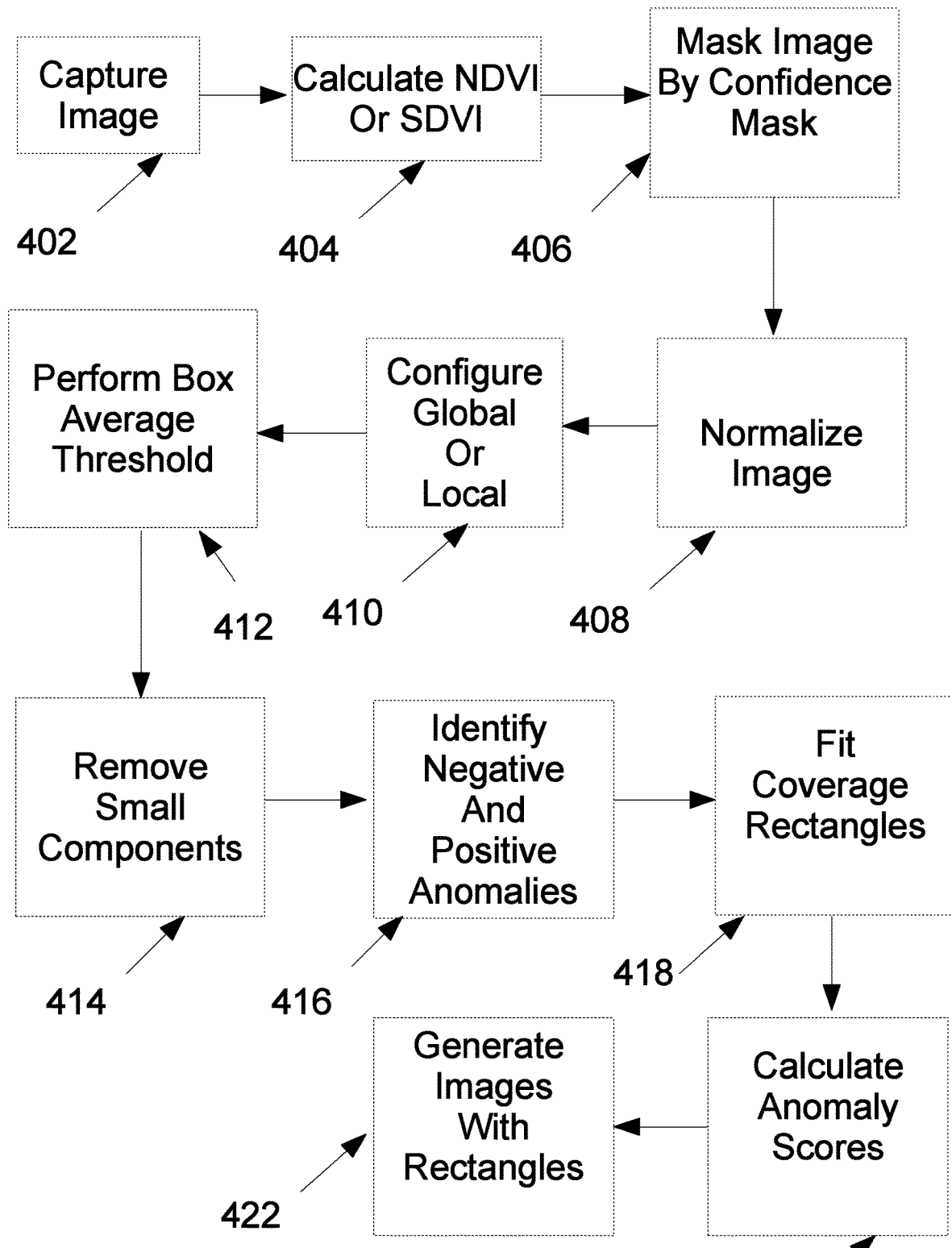
FIG. 4 depicts a schematic representation of a process used to calculate identify anomalies in an image.

FIG. 4 depicts a schematic representation of a process used to identify anomalies in an image. In step 402, an image is captured by the image gathering unit 112. The image may be captured using any conventional methods of capturing a digital image. In one embodiment, the image is a high resolution raw image. In one embodiment, the image is captured from an aircraft flying at least 1,500 feet above the surface. In step 404, the Normal Differential Vegetation Index (NDVI) or the Soil Adjusted Vegetation Index. The NDVI is calculated using the following equation:

$$NDVI = \frac{NIR - RED}{NIR + RED}$$

The near field channel (NIR) is identified in the image by the image analysis unit 114 where the near field channel is between 800 nm and 850 nm. The red channel (RED) is identified in each image by the image analysis unit 114 where the red channel is between 650 nm and 680 nm. The SDVI is determined using the following equation:

$$SAVI = \frac{NIR - RED}{(NIR + RED + L)(1 + L)}$$

Where L=0.5.

In step 406, the image analysis unit 114 masks the image using a confidence mask based on the NDVI or SDVI calculation. In step 408, the image is normalized. In one embodiment, a Gaussian distribution of image pixel values is performed by the image analysis unit 114. After the Gaussian distribution is applied, outlying pixels are identified as potential anomalies. The image is normalized using the following equation:

$$normalized(x, y) = \frac{image(x, y) - \mu(x, y)}{\sigma(x, y)}$$

where x is a row of pixels, y is a column of pixels, and µ(x,y) and σ(x,y) are the mean and standard deviation values. In step 410, the image analysis unit 114 calculates the mean and standard deviation values based on the portion of the image being analyzed. For global images, the mean and standard deviation are calculated taking into account all pixels in the image. For local images, i.e. the pixel (x,y), the mean and the standard deviation are determined taking into account only the square area around the pixel where the square area is a constant predetermined size.

In step 412, the image analysis unit 114 applies a box averaging threshold to prospective anomalies identified in the image. In one embodiment, a square box of a predetermined size is positioned around a specific anomaly area. In one embodiment, the box is 50 pixels by 50 pixels. The pixels in the box are scanned one pixel at a time and the mean value of the pixels in the box is calculated. If the mean value is greater than a predetermined threshold, the box is marked as an anomaly. In step 414, small areas marked as anomalies, areas less than 0.1% of the entire image, are removed as marked anomalies. In step 416, areas connected to the identified anomaly areas to determine the portions in each area that represent an anomaly. In step 418, cover rectangles are positioned around each anomaly. In step 420, the image analysis unit 114 calculates a score for each identified anomaly. In step 422, the anomaly rectangles are overlaid on the image as a whole to identify the anomaly areas.

What is claimed:

1. An image analysis system including:
   an image capture unit that captures at least one a high-altitude image having multiple channels;
   an image analysis unit operating in the memory of a computer that segments the high-altitude image into a plurality of tiles with each tile having a same pixel width and a same pixel height as an adjacent tile and determines an index value based on at least one channel of the image,
   wherein
   the image analysis unit performs a pixel by pixel analysis of the pixels in each tile to calculate a mean value for each tile,
   the image analysis unit identifies areas containing anomalies in each image by analyzing the mean value for each area connected to identified anomalies to determine areas where anomalies exist, and
   a score is assigned to each identified anomaly and an anomaly rectangle is placed on the image to identify areas where anomalies are identified.

2. The image analysis system of claim 1, wherein the index determined is a normal differential vegetation index for a segment of the captured image.

3. The image analysis system of claim 1, wherein the index determined is a soil adjusted vegetation index for a segment of the captured image.

4. The image analysis system of claim 1, wherein the image analysis unit masks the segment of the image using a confidence mask based on the index value.

5. The image analysis system of claim 4, wherein the image analysis unit normalizes the masked segment of the image.

6. The image analysis system of claim 5, wherein the image analysis unit calculates a mean and standard deviation of the segment of the normalized image.

7. The image analysis system of claim 6, wherein the image analysis unit applies a box averaging threshold to the segment of the normalized image.

8. The image analysis system of claim 7 wherein the image analysis unit calculates a mean for each pixel in the applied box.

9. The image analysis system of claim 8, wherein the image analysis unit removes pixels from the segment of the image that have a calculated mean below a predetermined threshold.

10. The image analysis system of claim 9, wherein the image analysis unit calculates a score for each of the remaining pixels and draws a rectangle around groups of pixels based on the scores of each pixel.

11. An image analysis unit including a processor and a memory with a method of analyzing an image performed in the memory, the method including the steps of:
    gathering a high-altitude image having multiple channels via an image capture unit;
    segmenting the high-altitude image into a plurality of tiles with each tile having a same pixel width and a same pixel height as an adjacent tile via an image analysis unit;
    determining an index value based on at least one channel of the image via the image analysis unit;
    performing a pixel by pixel analysis of the pixels in each tile to calculate a mean value for each tile via the image analysis unit,
    identifying areas containing anomalies in each image via the image analysis unit identifies areas containing anomalies in each image by analyzing the mean value for each area connected to identified anomalies to determine areas where anomalies exist, and
    assigning a score to each identified anomaly and placing an anomaly rectangle on the image to identify areas where anomalies are identified.

12. The method of claim 11, wherein the index determined is a normal differential vegetation index for a segment of the captured image.

13. The image analysis system of claim 11, wherein the index determined is a soil adjusted vegetation index for a segment of the captured image.

14. The image analysis system of claim 11, wherein the step of identifying anomalies includes masking the segment of the image using a confidence mask based on the index value.

15. The image analysis system of claim 14, wherein the step of identifying anomalies includes normalizing the masked segment of the image.

16. The image analysis system of claim 15, wherein the step of identifying anomalies includes calculating a mean and standard deviation of the segment of the normalized image.

17. The image analysis system of claim 16, wherein the step of identifying anomalies includes applying a box averaging threshold to the segment of the normalized image.

18. The image analysis system of claim 17, wherein the step of identifying anomalies includes calculating a mean for each pixel in the applied box.

19. The image analysis system of claim 18, wherein the step of identifying anomalies includes removing pixels from the segment of the image that have a calculated mean below a predetermined threshold.

20. The image analysis system of claim 19, wherein the step of identifying anomalies includes calculating a score for each of the remaining pixels and drawing a rectangle around groups of pixels based on the scores of each pixel.

* * * * *